G. G. LOBDELL.
Improvement in Adjustable Car Wheels.
No. 123,919. 
2 Sheets--Sheet 1.
Patented Feb. 20, 1872.
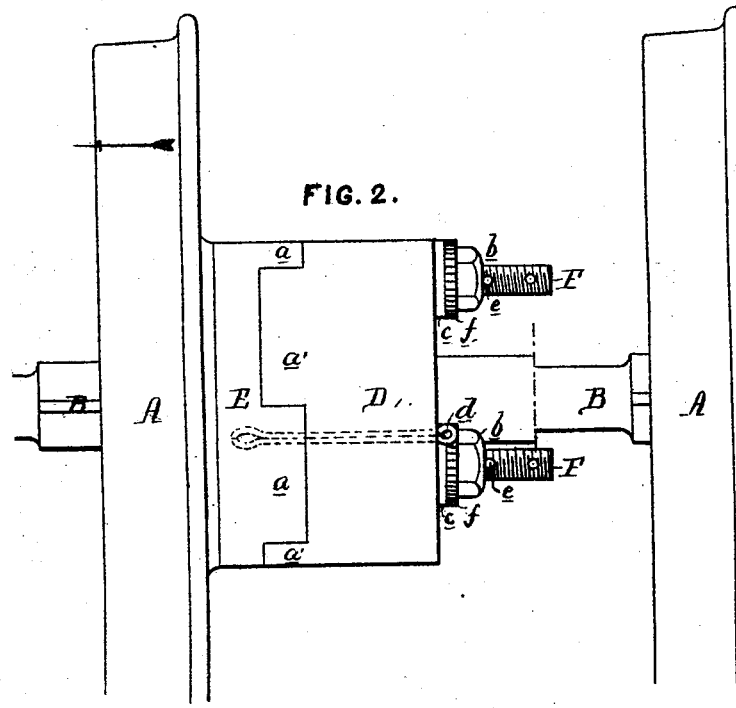
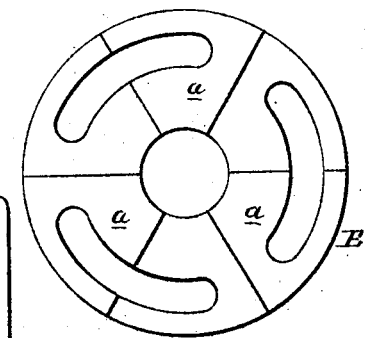
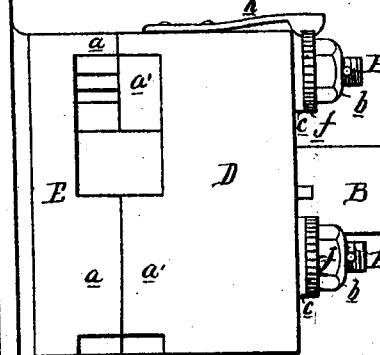

G. G. LOBDELL.
Improvement in Adjustable Car Wheels.
No. 123,919. Patented Feb. 20, 1872.
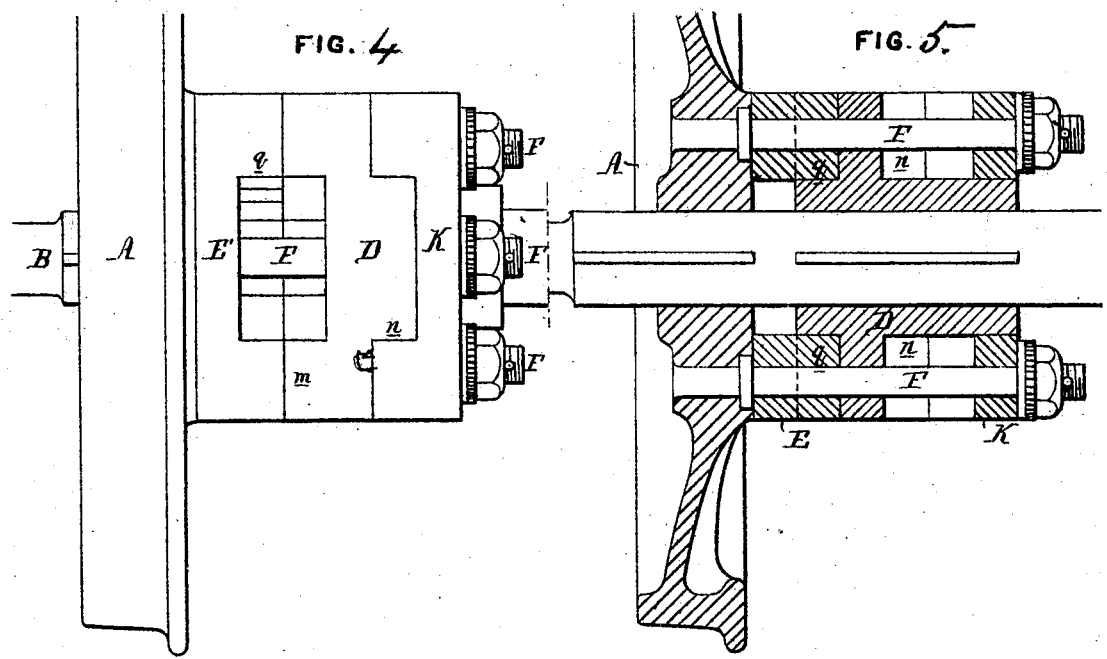
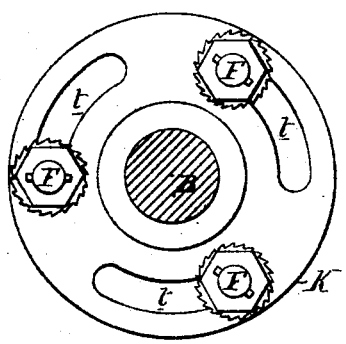
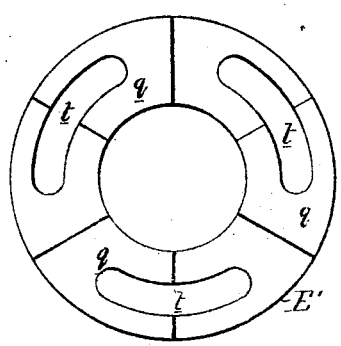
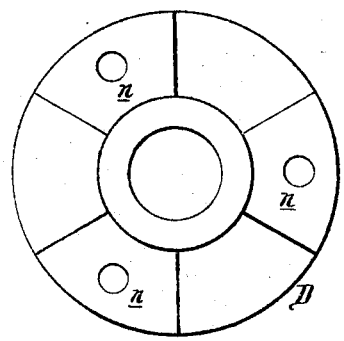
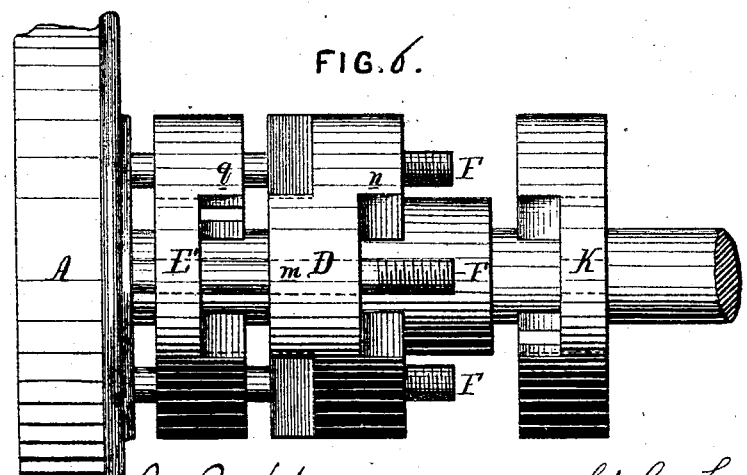

123,919

UNITED STATES PATENT OFFICE.

GEORGE G. LOBDELL, OF WILMINGTON, DELAWARE.

IMPROVEMENT IN ADJUSTABLE CAR-WHEELS.

Specification forming part of Letters Patent No. 123,919, dated February 20, 1872.

SPECIFICATION.

I, GEORGE G. LOBDELL, of Wilmington, county of Newcastle, State of Delaware, have invented an Improvement in Adjusting Car-Wheels, of which the following is a specification:

Nature and Object of the Invention.

My invention consists of certain devices, too fully explained hereafter to need preliminary description, whereby car-wheels can be readily adjusted for broad or narrow gauges, the devices being such that the wheels are rigidly retained in position after adjustment.

Description of the Accompanying Drawing.

Figure 1 (Drawing No. 1) is an edge view of a car-wheel with my improvement; Fig. 2, the same with the parts in a position differing from that shown in Fig. 1; Fig. 3, a face view of part of Figs. 1 and 2. Figs. 4, 5, and 6 illustrate a modification of my invention; Figs. 7, 8, and 9, face views of Figs. 4, 5, and 6.

General Description.

Figs. 1 and 2 show my invention in its simplest form, A being an ordinary cast-iron car-wheel, arranged to slide, to a limited extent, on the axle B, which is provided with a splint or feather to prevent the wheel from turning. A collar, D, is firmly secured to the axle, and between this collar and the hub of the wheel intervenes a ring, E, the latter having projections $a$, (three in the present instance,) adapted to corresponding recesses in the collar, and the projections $a'$ of the latter being arranged to fit snugly in recesses in the ring. The wheel, ring, and collar are secured together by three bolts, F, the outer ends of which are permanently secured to the wheels, the stems passing through the ring E and collar D, and being furnished with nuts $b$ and suitable washers $c$. When the several parts are in the position shown in Fig. 2, the wheel is arranged for a narrow-gauge track; but when the wheel has to be adjusted to a broader gauge, the nuts are loosened and turned until they nearly reach the transverse pins near the ends of the bolts, after which the wheel is moved in the direction of the arrow so far as to permit the ring E to be turned to such an extent that its projections $a$ will coincide with the projections $a'$ of the collar D, as shown in Fig. 1, when the nuts of the bolts are tightened, and the wheel is in a proper position for a broader gauge, the depths of the projections $a$ and $a'$ of the two rings and collars being together equal to the difference in width of the gauges of the two roads, to either of which the wheels can be adjusted. It will be understood that the holes in the ring E, through which the bolts pass, are so curved as to permit the turning of the ring E to the extent required. (See Fig. 3.) In addition to the security afforded by the bolts and nuts, I prefer to use a split pin, $d$, shown by dotted lines in Fig. 2, the pin being withdrawn prior to the turning of the ring, and reinserted when the ring has been adjusted to the position shown in Fig. 1, so that there can be no possibility of the ring turning from this position until the pin is again withdrawn. In order to prevent the loosening of the nuts I insert through the bolts small split pins, $e$, which, when the wheel has to be adjusted to the position shown in Fig. 1, can be withdrawn. As an additional means of preventing the turning of the nuts, I in some case provide each nut at its base with a ratchet-wheel, $f$, into the teeth of which engages a spring pawl, $h$, secured to the collar D, the ratchet and pawl being such that while the nut can be turned to tighten it, it cannot be turned back until the pawl is forced back from the ratchet.

In the modification illustrated in drawing No. 2, the fixed collar D has on one side projections $m$, adapted to recesses in a ring, E', and on the opposite side projections $n$, adapted to recesses in the ring K. Both of these rings are provided, for the passage of the bolts F, with segmental holes, so that they can be turned to a limited extent. When the projections $n$ of the collar D fit in the recesses of the ring K, and the projections $m$ of the same collar coincide with the projections $q$ of the ring E', all as seen in Fig. 4, the wheel will be in the position for a wide gauge. When it has to be adjusted for a narrow gauge, all that is necessary is to loosen the nuts of the bolts sufficiently to permit the turning of the rings E' and K, when the latter are so adjusted that the projections $m$ of the fixed collar D will fit into the recesses of the ring E', and the projections $n$ of the collar coincide with the projections K, when, after tightening the nuts, the wheel will be adjusted to a narrow gauge.

While the plan illustrated in Figs. 1, 2, and 3 may be considered the simplest mode of carrying out my invention, the protuberant ends of the screw-bolts, when the wheel is adjusted to a narrow gauge, and the necessity of extended movements of the nuts, when a change of gauge has to be made, may be considered objections which are obviated in the modification shown in drawing No. 2, where the change is made by the simple turning of the rings E and K, the presence of the latter ring obviating the protuberant ends of the bolts, seen in Figs. 1, 2, and 3.

Claims.

1. The combination, with an adjustable car-wheel and a fixed collar, of a movable ring having projections adapted to recesses in the said collar, all substantially as herein described, and as illustrated in Figs. 1 and 2.

2. The combination, with an adjustable car-wheel, of a fixed collar, D, having projections and recesses on both sides, and the recessed and movable rings E' and K, all substantially as hereinbefore described, and as illustrated in and by drawing No. 2.

In testimony whereof I have signed my name to this specification in the presence of two subscribing witnesses.

GEORGE G. LOBDELL.

Witnesses:
H. HOWSON,
HARRY SMITH.